Aug. 19, 1969   G. E. BARKER   3,462,115
ELECTROPNEUMATIC VALVE POSITIONER
Filed May 14, 1965   3 Sheets-Sheet 1

INVENTOR
GEORGE E. BARKER
BY
Robert J. Schaap
ATTORNEY

INVENTOR
GEORGE E. BARKER
BY
Robert J. Schaap
ATTORNEY

3,462,115
Patented Aug. 19, 1969

3,462,115
ELECTROPNEUMATIC VALVE POSITIONER
George E. Barker, St. Louis, Mo., assignor to Monsanto
 Company, St. Louis, Mo., a corporation of Delaware
Continuation-in-part of application Ser. No. 412,921,
 Nov. 23, 1964. This application May 14, 1965, Ser.
 No. 455,797
Int. Cl. F16k *29/02, 31/08*
U.S. Cl. 251—29           15 Claims

ABSTRACT OF THE DISCLOSURE

An electropneumatic valve positioner for controlling the valve plunger of a controllable valve in response to a control signal. The valve positioner includes a fluid pressure source, a relay acting upon the plunger and a pulsed solenoid control valve. An electrical sensor on the plunger of the main valve initiates a signal to the control circuit of the pulsed solenoid valve which will, in turn, actuate the relay to cause movement of the valve plunger of the main valve. The sensor will create a signal in proportion to the change of position and this will, in turn, generate a force pulse to create proper dithering action in the pulsed solenoid valve.

---

This application is a continuation-in-part of my copending application Ser. No. 412,921, filed Nov. 23, 1964, and now Patent No. 3,424,951.

This invention relates in general to certain new and useful improvements in valve positioners, and more particularly, to electropneumatic valve positioners with pulsed-solenoid flow action.

Today, automatic control instrumentation has found widespread use in many industries. Many processes, whether controlled manually or automatically, will perform well and efficiently only when the valves of certain process variables are held within given limits. Consequently, the employment of automatic control valves in many processing industries has grown steadily. However, many of the process variables in systems in which the presently available automatic control valves are employed are subject to dynamic changes. Consequently, the control valves now available are not capable of responding rapidly and accurately enough to the changes in the process variables. In order to overcome this problem, many of the control valves have been designed to provide sufficient force to position the valve accurately in proportion to the change in instrument pressure for most applications. Nevertheless, under difficult service conditions, this built-in force may not be sufficient to accurately position the valve in response to instrument pressure change.

In order to overcome the problems of positioning the valve accurately in proportion to changes in instrument pressure, valve positioners or so-called "operator positioners" have been employed in conjunction with the control valve. Valve positioners have found use in such applications as with single port valves capable of handling fluids which are subject to high pressure differentials or high pressure drops. They have found widespread use in installations which involve high pressures and therefore which require a tight valve stem packing. In similar manner, valve positioners are used in conjunction with valves capable of controlling viscous fluids or solids in a suspension state. Valve positioners have been found to be particularly useful in processes which contain process lag applications, such as temperature and pH control applications, or in installations where the control valve is located a great distance from the controller. Valve positioners have been found to be particularly useful in these applications, inasmuch as they assist in obviating the excess friction in the final control element, particularly in cases with high viscosity fluids. Moreover, the valve positioner is designed to reduce the dead band of the operator by at least 50% of the dead band normally occurring in valves without positioners. Furthermore, in a direct acting operator when high static unbalanced forces are present in the final control element, a positioner can deliver additional power in the form of higher air pressure than could be supplied from the pneumatic controller in order to hold the valve stem position.

While there is an omnipresent need for valve positioning in many control applications, the present commercially available valve positioners have not been employed in many applications where valve positioners are required or could improve the efficiency of the control operation. This is primarily due to the fact that valve positioners have achieved bad publicity in the past due to their inefficiency of operation. For any valve positioner to function properly, high loop gain is essential to overcome any loading effects placed on the valve. Since there are many and varied lagging-type components in the feedback loop, such as the volume of an air motor, oscillation and instability problems in the conventional valve positioners are common. It is this type of instability which has brought people in the process control industries to look upon valve positioners with disfavor.

The conventional valve positioners in practically all cases employ a variable flow orifice in the supply valve and which is made variable by a flapper valve or so-called "flapper assembly." The conventional valve positioner employs a nozzle which is covered by the flapper assembly and the size of this nozzle or orifice is greater than a fixed restriction in the supply valve, so that air can bleed faster than it is being supplied when the flapper valve is not restricting the orifice. Thus in the conventional valve positioners, when instrument pressure increases, the bellows of the valve will expand to move the beam, thereby causing the flapper to restrict the orifice. The orifice or nozzle pressure will increase and move a relay diaphragm assembly to open the main supply valve. The output pressure of the diaphragm of the control valve thereby increases moving the actuator stem or so-called "plunger" downwardly. A simple mechanical linkage, such as a cam and lever cause the beam to shift and which in turn causes the flapper valve to move away from the nozzle or orifice. As the nozzle pressure decreases and the relay supply closes to prevent any further increase in output pressure, the positioner is again in equilibrium but at a higher instrument pressure and a new valve plug position. However, valve positioners of this type inevitably contain backlash. Due to the fact that they operate a controllable element which has a large volume or may be distant to the control valve itself, there is often a problem of hysteresis.

It is, therefore, the primary object of the present invention to provide an electropneumatic valve positioner which is capable of varying the flow orifice by a pulsed-solenoid flow action.

It is another object of the present invention to provide an electropneumatic valve positioner of the type stated which employs an electrical feedback for generation of rate action and which, in turn, stabilizes the entire control system.

It is a further object of the present invention to provide a valve positioner of the type stated which contains a high loop gain and excellent dynamic response.

It is an additional object of the present invention to provide an electropneumatic valve positioner of the type stated which is adaptable for use in conjunction with control valves capable of being used in bench-scale equipment, pilot-plant equipment and commercial process equipment.

It is also an object of the present invention to provide an electropneumatic valve positioner of the type stated which can be employed in both low pressure and high pressure fluid systems.

It is still another salient object of the present invention to provide an electropneumatic valve positioner of the type stated which can be built in a small compact unit, which is relatively inexpensive to manufacture and has a high degree of reliability.

With the above and other objects in view, my invention resides in the novel features of form, construction, arrangement and combination of parts presently described and pointed out in the claims.

In the accompanying drawings (3 sheets):

General description

Figure 1:
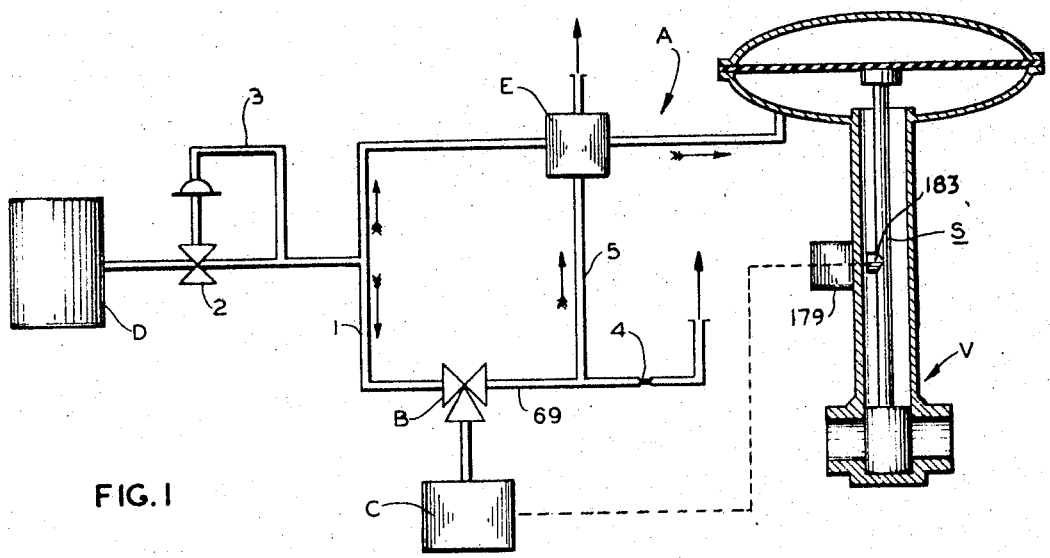
FIGURE 1 is a schematic view illustrating the various components and operative connections thereof forming the electropneumatic valve positioner of the present invention.

Generally speaking, the electropneumatic valve positioner of the present invention is a voltage-balance operating device and includes a pulsed-solenoid operated control valve having a plunger which oscillates or vibrates off of a valve seat in response to an electrical signal from a control circuit. The control valve is capable of modulating control action by varying the voltage to the solenoid coil of the control valve and is designed to control fluid flow in response to changes of a measured physical variable. The valve is generally provided with inlet and outlet ports, the outlet port having a valve seat. The vibratory plunger shifts with respect to the valve seat for controlling the flow of fluid through the valve housing.

The control circuit is provided for measuring changes in the measured physical variable and providing control pulses to the solenoid coil of the control valve. The control circuit generally includes a sensory mechanism for measuring the change in the sensed physical variable and a mechanism for converting this measured physical property change into a proportional voltage or current change. The control circuit includes a relaxation oscillator which is designed to convert the voltage or current changes into a sequence of timed pulses. Finally, a silicon controlled rectifier is provided for transmitting the current pulses in timed relationship to the solenoid coil for actuating the plunger. In this manner, it is possible to maintain controlled vibration of the plunger off of the valve seat for regulating fluid flow in proportion to the change of the sensed physical variable.

The explanation of this flow control phenomenon involves a rather new control principle, namely, controlled mechanical vibration of the plunger at line frequency. This mechanical vibration is a forced vibration caused by the pulsating force exerted on the plunger by the solenoid coil. During the pulse cycle, the force exerted on the plunger starts from a zero level, reaches a maximum level, and returns to a zero level. If the average force exerted on the plunger by this pulsating voltage application is equal to or greater than the spring force which is designed to hold the plunger in a closed position, the plunger will snap open in a conventional solenoid-valve fashion. If, however, the average force exerted on the plunger by the coil is less than the spring force, but the maximum force is greater than the spring force, then the plunger will be lifted from the valve seat during a portion of the pulse cycle. During the lift portion of the cycle, the motion of the plunger can then be described by conventional force-mass differential equations. The effective valve opening can then be conveniently described by the time integral of the vertical lift of the plunger.

The term "pulsed solenoid" with regard to control valves is a new concept in the art of control valves. Therefore when reference is made to pulsed-solenoid control valves or pulsed-solenoid operation of control valves, it is to be understood that reference is made to the pulsed-solenoid operated control valve more fully illustrated and described in copending application Ser. No. 412,921, filed Nov. 23, 1964.

The pulsed solenoid operated control valve employed in the present invention contemplates a unique type of valve plunger and valve seat combination which advantageously employs controlled radial vibrations to eliminate uncontrolled axial rebound vibrations of the valve plunger. By employment of a constrained conically shaped Teflon seat, the effect of rebound vibrations is almost completely eliminated. The seat is preferably formed of a tetrafluoroethylene polymer normally marketed under the trade name "Teflon." This type of arrangement has an additional advantage in that it is now possible to employ variable amplitude sine wave power to energize the solenoid coil, due to the fact that rebound vibrations have been eliminated.

The fluid supplied for the operation of the pulsed-solenoid control valve in the preferred embodiment is air which can be conveniently provided by many conventional sources of air pressure. The source of air pressure is connected to the inlet port of the control valve and interposed between the inlet port and the source of air pressure is a conventional pressure regulator for providing a constant pressure source of air to the control valve.

A fixed orifice or restriction is placed in a downstream position from the pulsed-solenoid control valve and discharges to atmospheric pressure, thereby creating an internal feedback or so-called "negative feedback" which materially improves the flow stability of the control valve. The valve efficiency is increased under this force-balance type principle and therefore, the valve seat area should be as large as possible. It can be seen that if the control valve itself was employed only as a flow control device, the effect of a pressure differential across the valve seat would be a detriment to operation since the "set point" of the valve changes with differential pressure. However, when used as a force-balance device as herein provided, the effect operates to the advantage of the valve.

At very low flow rates, vibration amplitude is low and flow occurs near the "lift-off" point of the valve plunger. In other words, when the maximum magnetic force on the valve plunger equals the resultant of other forces on the plunger, the fluid flow through the valve will commence. The valve in the present application is used in a flow-to-open pattern and therefore the pressure differential across the seat will oppose the spring force normally biasing the valve plunger to its closed position. Thus, for a given maximum magnetic force, the differential pressure across the valve seat will determine the point when fluid flow begins. Thus, it can be seen that the valve will tend to maintain a constant differential pressure across itself. It can also be seen that the flow rate through the valve is a linear function of the control voltage or the voltage input. Consequently, the pulsed-solenoid valve with the fixed restriction in a downstream position serves as an electropneumatic transducer with linear characteristics.

It can be seen that the downstream pressure on the downstream side of the control valve is linearly related to the voltage input of the control circuit. In other words, the pressure at a point between the fixed orifice and the discharge port of the control valve is a control pressure which is linearly related to the voltage input of the control circuit. This control pressure is transmitted to a conventional diaphragm type relay which is, in turn, connected to a suitably controlled element, such as an air motor. The relay includes an internal air supply chamber which is capable of communication with an air pressure chamber and an exhaust chamber. Moreover, the chambers are separated by a movable plunger which sits in fixed restriction between each of the chambers. The relay also includes a control pressure chamber with a bellows or diaphragm internally disposed therein. Thus as the control pressure increases, the diaphragm forces the plunger to close the exhaust chamber to the pressure chamber and open the pressure chamber to the air supply chamber. As a result thereof, air is supplied to the controlled element. If on the other hand, the control pressure is reduced, the diaphragm will permit the plunger to be spring biased to the position where the exhaust chamber is open to the air pressure chamber and the air supply chamber is sealed to the air pressure chamber. Thus, it can be seen that the control pressure operates the relay in response to the changes of the voltage input to the control circuit. As the relay itself is operated in response to the changes of control voltage, it can be seen that the controlled element itself is operated in response to changes in the control voltage. Moreover, by employment of this relay, a high loop gain can be achieved.

Detailed description

Referring now in more detail and by reference characters to the drawings which illustrate a preferred embodiment of the present invention, A designates an electropneumatic valve positioner substantially as shown in the schematic illustration of FIGURE 1. The electropneumatic valve positioner A is comprised of various components in combination, each of which is hereinafter discussed in more detail. The valve positioner A generally comprises a pulsed-solenoid control valve B which is electrically connected to a control circuit C, the valve B being more fully illustrated in FIGURES 2 and 3 and the control circuit C being more fully illustrated in FIGURE 4 hereof. The inlet port of the control valve B is connected to an air supply source D through an air supply line 1. Interposed between the control valve B and the air supply source D is a conventional pressure regulator 2 which is designed to provide twenty p.s.i.g. downstream air pressure. The air supply line 1 is also connected to an air supply line 3 which is in turn connected to a relay E. On the downstream side of the control valve B is a fixed orifice 4 which creates a negative feedback across the valve B. Connected between the discharge port of the valve B and the fixed orifice 4 is a control pressure line 5 which is also connected to the relay E in the manner more fully described hereinafter. Each of the aforementioned components is hereinafter described in more detail.

Control valve

Figures 2, 3:
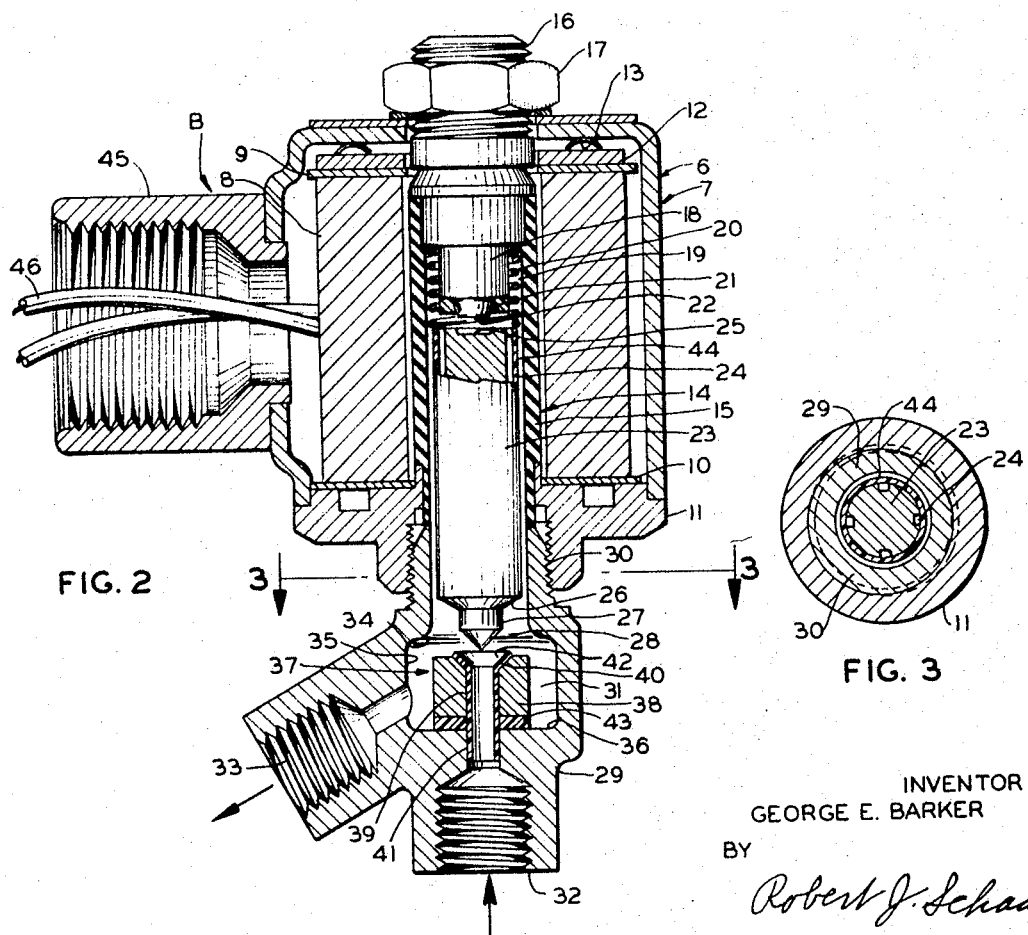
FIGURE 2 is a vertical sectional view, partially broken away, of an electrically operated control valve forming part of the electropneumatic valve positioner of FIGURE 1.
FIGURE 3 is a fragmentary sectional view taken along line 3—3 of FIGURE 2.

The control valve B is more fully illustrated in FIGURES 2 and 3 and is substantially similar in operation to the electrically operated control valve described in copending application Ser. No. 412,921, filed Nov. 23, 1964. The valve B generally comprises an outer control valve housing 6 including a somewhat cylindrical coil housing 7. Disposed within the housing 7 is a helically wound cylindrical solenoid coil 8 and disposed upon opposite ends thereof are upper and lower insulating washers 9 and 10, respectively. The insulating washer 10 is facewise disposed upon the upper surface of a base plate 11 which forms part of the outer coil housing 7. Facewise disposed upon the upper insulating washer 10 is a circular flux plate 12. The assembly of the solenoid coil 8, the insulating washers 9, 10 and the flux plate 12 is suitably held in place and urged downwardly toward the base plate 11 by means of a set of flat springs 13. By reference to FIGURE 2, it can be seen that the springs 13 are interposed between the upper surface of the flux plate 12 and the undersurface of the top wall forming part of the coil housing 7.

The coil housing 7 and the solenoid coil 8 are centrally apertured to accommodate a plunger tube assembly 14 which comprises a cylindrical tube 15 disposed axially within the coil housing 7 and which contains a central non-magnetic section surrounded by magnetic sections at each transverse end. Secured to the upper end of the tube 15 is a plug 16 which is retained by a nut 17, substantially as shown in FIGURE 2. The plug 16 projects inwardly into the tube 15 and at its lower end, is diametrally reduced in the provision of a downwardly extending boss 18, thereby providing an annular relief 19 for accommodating a compression spring 20. Integrally formed with and extending downwardly from the lower end of the boss 18 is a projection 21, the lower face of which serves as a plunger stop 22. Reciprocatively disposed within the tube 15 and being adapted for vibratory movement is a valve plunger 23 which is provided with four radially spaced axially extending fluid ducts or reliefs 24. At its upper end, the plunger 23 is milled to provide a plunger head 25.

The valve plunger 23 employed in the valve B of the present invention is substantially similar to the valve plunger described in my copending application Ser. No. 457,969, filed May 24, 1965. At its lower end, the valve plunger 23 is milled to form a relatively flat inwardly and downwardly tapering side wall 26 which forms an angle of approximately 45° with respect to the axial centerline of the plunger 23. The side wall 26 integrally merges into a downwardly projecting plunger seating plug 27. The plug 27 is also formed with a pointed lower end formed by a downwardly and inwardly projecting conically shaped bottom wall 28. By further reference to FIGURE 2, it can be seen that the side wall extends at an angle of 45° with respect to the axial centerline of the plunger 23 so that the overall angle of the conical section with respect to the plunger axial centerline is within the range of 85° to 95° and preferably 90°.

The base plate 11 is internally bored and threaded to accommodate a valve body 29 which is integrally formed with an externally threaded fitting 30 at its upper end, substantially as shown in FIGURE 1. The valve body 29 is internally formed with a substantially large fluid chamber 31 communicating with a fluid inlet port or orifice 32 and a fluid outlet port 33 formed in the valve body 29. The fluid inlet port 32 and the outlet port 33 may be internally threaded to accommodate pipe fittings, as desired. The fluid chamber 31 is formed by a top wall 34, an annular side wall 35 and a bottom wall 36.

Disposed within the chamber 31 is a valve seating mechanism 37 of the type described in the aforementioned copending application Ser. No. 457,969, filed May 24, 1965. The valve seating mechanism 37 generally comprises a fairly rigid retaining sleeve 38, preferably formed of stainless steel or similar hard non-corrosive material and which is provided with an axial bore 39. The retaining sleeve 38 is countersunk at the upper end of the bore 39 forming a conically shaped wall 40. Snugly fitted within the bore 39 and extending axially therethrough is a hollow tube 41, preferably formed of Teflon, Buna N rubber, or plastic material sold under the trademark Viton A and which integrally includes an outwardly flaring valve seat 42 at its upper end. By reference to FIGURE 1, it can be seen that the valve seat 42 is seated in facewise engagement with the relatively flat conically shaped wall 40 and that the tube 41 extends beyond the lower end of the retaining sleeve 38 and into the inlet port 32. In this connection, it should be noted that the tube 41 is sized to seat snugly against the wall of the port 32 in a fluid-tight seating arrangement. The valve seat 42 is flared outwardly at an angle within the range of 80 to 84°, and preferably 82°. It was found in connection with the present invention that by forming the bottom wall 28 of the plunger 23 with an angle of 90° and by forming the valve seat 42 with an angle of 82°, with respect to the axial centerline thereof, flow noise was reduced to a minimum. While the tube 41 and integrally formed valve seat 42 may be formed of many plastic or synthetic resinous materials which are capable of resisting cold flow, it has been found that Teflon has produced the most desirable results. Teflon, however, has a tendency to "creep" when subjected to strain and this creep has been eliminated by the metal retaining sleeve 38. Secured to the underside of the retaining sleeve 38 is a cylindrical relatively thick washer 43 which is preferably formed of the same material as the tube 41 and the seat 42 and which serves as a cushion for the impact of the plunger 23 against the valve seat 42. In the preferred embodiment of this invention, the washer 43 is, therefore, formed of the same type of Teflon material as the seat 42.

By means of the above outlined construction, it can be seen that the valve body 29 can be removed by threadedly disconnecting the threaded fitting 30 from the base plate 11. Moreover, the valve seating mechanism 37 can easily be removed and replaced when necessary. Inasmuch as the seating mechanism 37 is retained within the chamber 31 by the extended end of the tube 41, the seating mechanism 37 can readily be pulled out of its seated position by removing the tube 41 from the inlet port 32. In addition to the obvious effect on leakage, the seat composition has a strong effect on the secondary or rebound vibrations. As previously indicated, the secondary vibrations are undesirable inasmuch as they adversely affect the instability of the valve and produce much of the flow noise associated with pulsed solenoid operations. The Teflon material was found to produce a desired elastic coefficient for the wide range of stable operation and was, therefore, found to produce very suitable results when employed as a valve seat.

Without the steel restraining sleeve 38, the Teflon material exhibited a memory effect due to cold flow in operation at very low amplitude vibrations. The restraining effect of the stainless steel retaining sleeve 38 practically eliminated this cold flow. Moreover, by virtue of the fact that the valve seat 42 is seated in facewise engagement against the conically shaped wall 40, the impact of the plunger 23 will not create any displacement of the seat 42.

It was also found that flow noise was substantially reduced by jacketing the valve plunger 23 with a Teflon sheath 44 which is circumferentially disposed around the plunger 23 for its entire length. However, a sufficient amount of clearance was maintained between the outer cylindrical surface of the sheath 44 and the interior annular surface of the tube 15 to permit fluid flow. When the sheath 44 was eliminated, the valve plunger 23 appeared to have two stable vibration states for each power level to the solenoid coil 8. In this two-state vibration condition, transition from one state to the other state occurred within 16 milliseconds and produced a flow offset of approximately 5 percent. With the Teflon sheath 44 circumferentially disposed about the plunger 23, it was found that only one vibration state existed and flow noise was reduced to less than 0.2 percent. It is believed that this reduction of the two stable vibration states and elimination of transition therebetween was due to a combination of minimizing friction between the cylindrical tube 15 and the valve plunger 23, and to a dampening of uncontrolled radial vibrations which is hereinafter discussed in more detail.

It has also been found that it is possible to reduce the flow noise by inserting Teflon strips into each of the four radially spaced fluid reliefs 24. In this embodiment of the valve plunger, the Teflon sheath is eliminated. The four radially spaced axially extending strips of Teflon reduce the two stable vibration states to a single state. It should be understood that a sufficient amount of clearance is provided between the annular surface of the valve plunger 23 and the interior annular surface of the tube 15 so that fluid flow can be maintained therebetween. This modification of the valve plunger 23 is more fully illustrated and described in the aforementioned copending application Ser. No. 457,969, filed May 24, 1965. This unique type of valve plunger and valve seat combination just described advantageously employs controlled radial vibrations of the valve plunger to eliminate the uncontrolled axial rebound vibrations of the valve plunger. By employment of a constrained conically shaped Teflon seat in combination with a conically shaped point on the lower end of the valve plunger, the axial rebound vibration is almost completely eliminated inasmuch as the energy which was normally consumed in the axial rebound vibration is employed in the controlled radial vibration. Moreover, by employment of a Teflon sheath circumferentially disposed about the valve plunger, it is possible to eliminate the two stable states of vibration of the valve plunger with transition therebetween. If this type of combination were employed in the control valve of the present invention, it would have the inherent additional advantage that it would be possible to employ a variable amplitude sine wave power for energization of the solenoid coil due to the fact that the axial rebound vibrations would have been eliminated.

Figure 4:
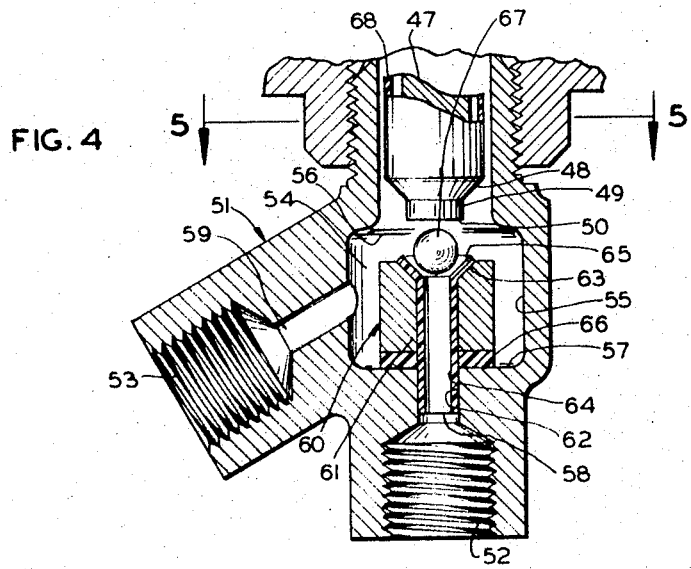
FIGURE 4 is a fragmentary sectional view of a modified form of valve seat-valve plunger combination employed in the control valve of FIGURE 2.

The valve B is also provided with a fitting 45 for accommodating a pair of leads 46 to the solenoid coil 8, in the manner as shown in FIGURE 2. The leads 46 are ultimately connected to the control circuit C which is schematically illustrated in FIGURE 4.

Figure 5:
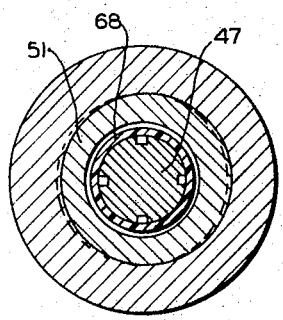
FIGURE 5 is a fragmentary sectional view taken along line 5—5 of FIGURE 4.

It is possible to use a modified form of valve seat-valve plunger combination employing a relatively flat-headed plunger and seating ball, which is more fully illustrated and described in the aforementioned copending application Ser. No. 457,969, filed May 24, 1965. This modification is illustrated in FIGURES 4 and 5 herein. The valve plunger 47 of this modification is milled at its lower end to form a relatively flat inwardly and downwardly tapering side wall 48 which forms an angle of approximately 45° with respect to the axial centerline of the plunger 47. The side wall 48 integrally merges into a diametrally reduced downwardly projecting plunger seating plug 49 having a relatively flat seating face 50. The valve in this embodiment employs a valve body 51 which is substantially similar to the previously described valve body 29 and is formed with an inlet port 52 and an outlet port 53 which communicates with a rather large internal fluid chamber 54. Moreover, the chamber 54 is formed by an annular side wall 55 which integrally merges into an upwardly and inwardly tapering top wall 56 and with a bottom wall 57. The fluid port 52 forms an inlet orifice 58 with the internal chamber 54 and the outlet port 53 forms an outlet orifice 59 with the internal chamber 54. Moreover, each of the ports 52, 53 can be internally threaded for accommodating standard pipe fittings as desired.

Internally disposed within the chamber 54 is a seating mechanism 60 which comprises a cylindrical retaining sleeve 61 preferably formed of stainless steel and which is provided with a central axial bore 62. The axial bore 62 merges at its upper end into a conically shaped outwardly tapering retaining wall 63 which forms an overall angle of approximately 90° with respect to the axial centerline of the retaining sleeve 61. Disposed within the axial bore 62 is a Teflon tube 64 having an outwardly flared valve seat 65 integrally formed therewith at its upper end, substantially as shown in FIGURE 4. It can be seen that the Teflon tube 64 is sized to fit snugly within the axial bore 62 in fluid-tight engagement with the walls of the bore and moreover, the seat 65 is sized to fit snugly against the conically shaped wall 63. Again by definition, the overall angle of the seat 65 is approximately within the range of 80° to 84° and preferably 82° with respect to the axial centerline of the retaining sleeve 61. Interposed between the retaining sleeve 61 and the bottom wall 57 of the valve body 51 is a Teflon washer 66.

Interposed between the lower face of the valve plunger 47, that is the seating face 50, and the valve seat 65 is a seating ball 67 preferably formed of a relatively hard stainless steel material. In this modification of the pulsed-solenoid valve B, the seating ball replaces the tapered conically shaped lower end of the valve plunger. Moreover, it can be seen that the axial movement of the valve plunger 47 is limited so that the ball 67 is never completely permitted to become displaced from the conically shaped seating area formed by the valve seat 65. As the valve plunger 47 vibrates during the controlled vibration in operation, the seating face 50 will force the seating ball 67 against the conically shaped valve seat 65. The conically shaped upper wall 63 forming part of the retaining sleeve 61, will prevent deformation and creep of the Teflon seat. Moreover, it can be seen that the Teflon tube 64 is formed with an extended lower end which extends into the port 52 for convenient insertion and removal of the valve seat mechanism 60.

By use of the above styled arrangement, it is possible to again obtain controlled radial vibration. The conically shaped seating surface completely eliminates the effect of the axial rebound vibrations by permitting the seating ball 67 to become involved in very fast radial oscillations. It is again theorized that the energy which was normally employed in the axial rebound vibration of the valve plunger 47 has been dissipated by the very much faster side-to-side bounces of the seating ball 67 off the sloping surface of the valve seat 65.

In connection with the modification of the pulsed-solenoid valve B just described, it has also been found that flow noise can be materially reduced by jacketing the plunger 47 in a Teflon sheath 68. Without the sheath 68, the plunger appears to have two stable vibration states for each power level to the coil. Again, transition from one state to the other state occurs within approximately 16 milliseconds and produces a flow offset of approximately 5 percent. With the sheath 68 surrounding the plunger 47 for its entire axial length, it has been found that only one stable state of vibration exists and that flow noise as a result thereof has been reduced to less than 0.2 percent. The elimination of this two stable vibration state and transition therebetween is again believed to be due to the existence of minimizing the friction between the exterior surface of the valve plunger 47 and the interior surface of the tube in which the plunger 47 oscillates and also to the damping of the uncontrolled radial vibrations. It should also be understood that there is sufficient clearance between the surface of the sheath 68 and the interior surface of the cylindrical tube so that fluid flow may occur therebetween. It is also possible to eliminate the two stable vibration states from each power level to the coil by inserting Teflon strips in each of the four radially spaced axially extending fluid ducts formed in the plunger 47. Here again, transition has been reduced and flow offset has been reduced from approximately 5 percent and flow noise reduced to less than 0.2 percent.

It is also possible to employ the valve seat-valve plunger combination of the pulsed solenoid control valve described in copending application Ser. No. 412,921, filed Nov. 23, 1964. In this valve seat-valve plunger combination, the valve plunger 23 is internally bored from its bottom face to accommodate a Teflon disc which is surrounded by a stainless steel ring. This modification also employs a relatively flat seat with an orifice formed therein communicating with the outlet port. In connection with the valve seat-valve plunger combination just described, it was found that a seat formed of Teflon produced the most desirable results of any material analyzed. Teflon possessed a high elastic co-efficient but which was sufficient for an adequately stable range of operation. The rebound vibrations were sufficiently negligible and it was found that the valve seat $s$ had a rather extended life.

Improved stability can also be achieved by preventing repeatable and uncontrollable radial vibrations of the plunger 23. This can be accomplished by wrapping the upper end of the plunger with Teflon tape. Preferably, a tab (not shown) can be silver soldered on the valve body so that the tab keys into one of the reliefs or grooves 24 of the plunger 23. The groove, of course, is marked so that the plunger 23 may always be reassembled in the same position. This type of construction eliminates the effect of slight non-concentricity of the plunger 23 with the orifice 32 so that the orifice indentation on the seat is always in the same radial orientation.

Threadedly connected to the outlet port 33 of the valve B is a discharge line 69 and which is provided with the diametrally reduced portion which constitutes the fixed orifice 4, substantially as shown in FIGURE 1. The discharge side of the fixed orifice is vented to the atmosphere. The placing of the fixed orifice 4 on the downstream side of the control valve B produces a unique result of increased stability in that internal feedback or so-called "negative feedback" is produced. Moreover, the noise of the control valve B is materially reduced.

The theory of providing increased stability by means of the negative feedback can be realized by analysis of the valve at very low flow rates. At low flow rates, the amplitude of vibration of the valve plunger 23 is very low and flow will occur only near the "lint-off" point. In other words, the plunger 23 will not move from its closurewise position on the valve seat $s$ until the peak magnetic force exceeds the net downward force on the valve plunger 23. As previously indicated, the net downward force on the valve plunger 23 is the resultant force of the weight of the mass of the plunger 23 and the force created by the spring 20. When the maximum magnetic force then equals the resultant of the other forces on the plunger, the valve plunger will lift from the valve seat $s$. It can thus be seen that while the flow-to-open pattern is employed in the present device, the pressure differential across the valve seat will oppose the spring force holding the plunger in a closed position. Therefore, the differential pressure across the valve seat will determine the point when flow begins for a given maximum magnetic force.

Inasmuch as the inlet port 32 is designed to create flow immediately beneath the valve seat, so that there is a flow-to-open pattern, pressure on the upstream side of the valve B tends to move the valve plunger 23 away from its seated position. This is, of course, balanced by the downward pressure created by the spring 20 and the mass of the plunger 23. When the maximum magnetic force and the upward force created by the upstream pressure exceeds the downward forces on the plunger 23, the plunger 23 will move from the valve seat $s$. However, it can be observed that the fluid surrounding the plunger 23 tends to move the plunger 23 to a closed position. Increased flow through the valve B will tend to build up a greater pressure on the upstream side of the orifice 4 within the discharge line 69. This increased pressure occurs within the chamber 31 and tends to force the valve plunger 23 to its closed or seated position. Consequently, there is a constant balancing of forces between the chamber 31 and the inlet port 32. This "internal feedback" which is produced reduces the differential pressure across the valve upon an increase of flow rate and thereby tends to lower the flow rate. Consequently, improved stability is achieved.

It can be seen that the control valve B with the fixed orifice 4 in the downstream position also serves as a direct acting electropneumatic transducer in that an increase in the voltage signal to the control circuit of the pulsed-solenoid control valve B will create a correspondingly linear increase in pressure on the downstream side of the control valve B.

Control circuit

Figure 6:
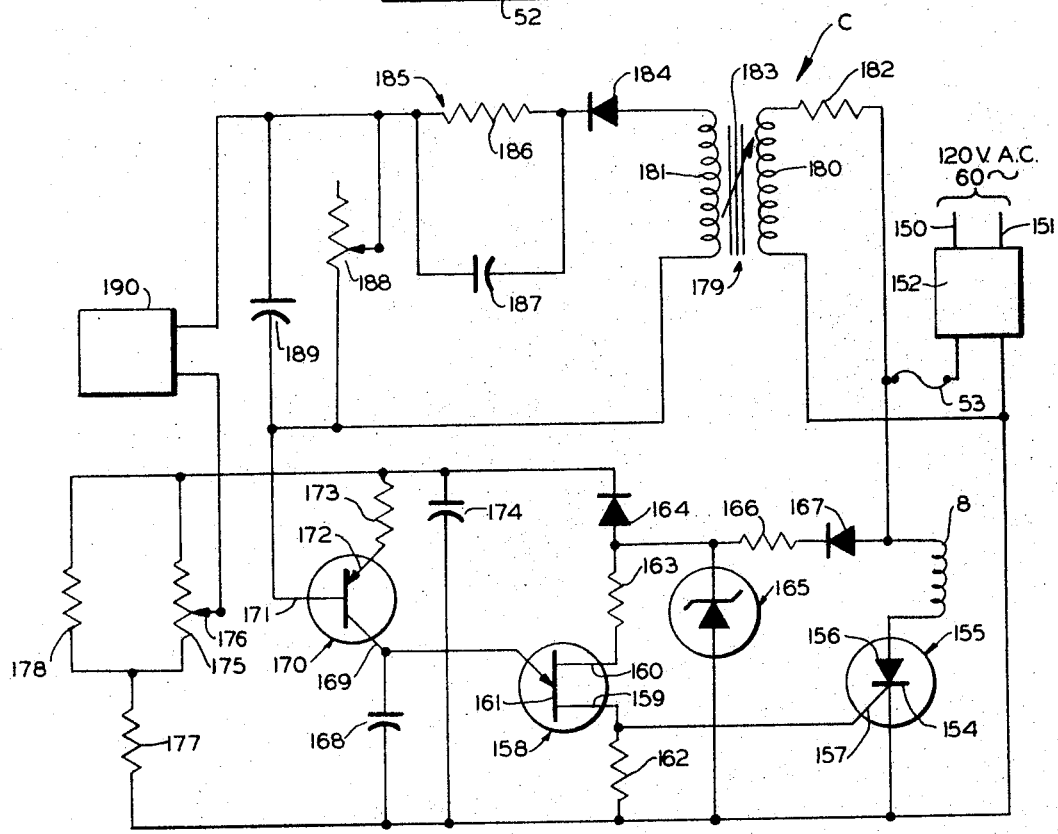
FIGURE 6 is a schematic view illustrating the electrical control circuit which is electrically connected to and designed to operate the electrically operated control valve of FIGURE 2.
Figure 7:
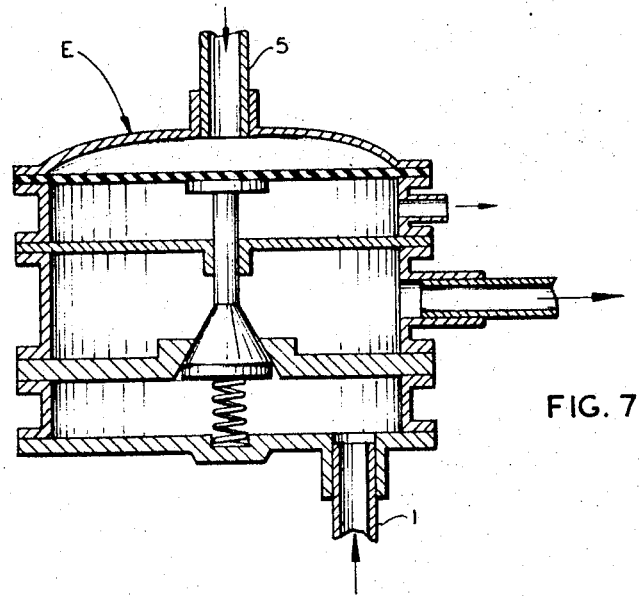
FIGURE 7 is a vertical sectional view, partially broken away, of a pneumatic relay forming part of the electropneumatic valve positioner of the present invention.
Figure 9:
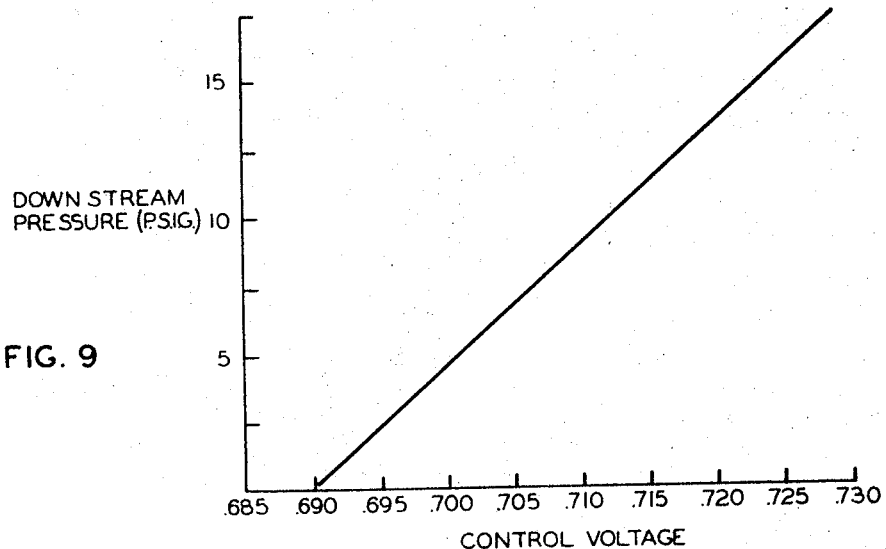
FIGURE 9 is a diagrammatic view illustrating the linearity of the control voltage as a function of downstream control pressure of the electropneumatic valve positioner of the present invention.

The control circuit C as schematically shown in FIGURE 6 is powered from a 117 volt source of alternating electrical current (not shown) and includes a positive conductor 150 and a neutral conductor 151 which are connected to a transformer 152. The positive conductor 150 is connected through a fuse 153 to the solenoid coil 8. The neutral conductor 151 is connected to the cathode 154 of a silicon controlled rectifier 155, the latter also including an anode 156 and a base 157. The anode 156 of the silicon controlled rectifier 155 is electrically connected to the opposite terminal of the solenoid coil 8, substantially as shown in FIGURE 6. If desired, a thermistor (not shown) can be interposed between the silicon controlled rectifier 155 and the solenoid coil 8 to compensate for undesired temperature effects.

The firing angle of the basic voltage output of the control circuit C to the solenoid 8 is, of course, controlled by measured changes in a sensed physical variable. This change is measured in the form of a control voltage which is provided by any suitable electrical controller and is hereinafter discussed in detail.

The basic timing device that controls the firing angle of the circuit in relation to the measured change in the physcial variable is a unijunction transistor 158 which is provided with a base-1 159, a base-2 160 and an emitter 161. The base-1 159 is connected directly through a fixed resistor 162 to the neutral line 151. The base-2 160 is connected through a temperature compensating resistor 163 to a diode 164 and to one common terminal of a Zener diode 165. The opposite terminal of the Zener diode 165 is connected to the neutral line 151. The common terminal of the Zener diode 165, which is connected to the diode 164 is also a fixed resistor 166 which is, in turn, connected to a diode 167, the later also being connected to the solenoid coil 8. The base-1 159 is also electrically connected to the base 157 of the silicon controlled rectifier 155 as shown in FIGURE 6.

The emitter 161 is connected directly to a capacitor 168, which is in turn connected to the neutral line 151. The emitter 161 is also connected to a collector electrode 169 of a PNP transistor 170, the latter serving as a "degenerated common emitter" and including a base electrode 171 and an emitter electrode 172. The emitter electrode 172 is, in turn, connected through a high impedance resistor 173 to the diode 164. Connected across the positive conductor 150 and the neutral line 151 is a capacitor 174. A surge suppressor (not shown) can be connected across the positive conductor 150 and the neutral line 151, if desired, in order to suppress any transient voltage.

Also connected across the conductors 150, 151 is a reset potentiometer 175 having a movable arm 176. The reset potentiometer 175 is connected across the conductors 150, 151 in series with a fixed resistor 177. Shunting the potentiometer 175 in parallel therewith, is a fixed resistor 178. Thus, by reference to FIGURE 6, it can be seen that one terminal of the reset potentiometer is connected in common with the diode 164, the capacitor 174, and the resistor 173.

The control circuit C includes a variable transformer 179 having a primary coil 180 and a secondary coil 181. By reference to FIGURE 6, it can be seen that the primary coil 180 is connected across the positive conductor 150 and the neutral conductor 151. Moreover, interposed between the positive conductor 150 and one terminal of the primary coil 180 is a dropping resistor 182. The variable transformer 179 includes a movable core 183 which is physically attached to the valve stem s of a control valve V, and is movable therewith. While the physical connection between the movable core 183 of the transformer 179 and the stem s of the controlled valve V is not illustrated, it should be understood that this connection could be made in any conventional manner either directly or by a simple mechanical linkage. Accordingly, the mechanical connection between the core 183 and the valve stem s is neither illustrated nor described in detail herein.

The secondary coil 181 is connected to a diode 184 which serves as a half-wave rectifier, and the diode 184 is in turn, connected to a rate action generator 185 which consists of a fixed resistor 186 shunted by a capacitor 187, substantially as shown in FIGURE 6. Connected across one terminal of the rate action generator 185 and the free terminal of the secondary coil 181 is a gain potentiometer 188 and electrically connected in parallel with the gain potentiometer 188 is a capacitor 189. By further reference to FIGURE 6, it can be seen that the negative terminal of the capacitor 189 and a common terminal of the gain potentiometer 188 is connected to the base electrode 171 of the degenerated common emitter transistor 170. Moreover, the positive terminal of the capacitor 189 and the common junction of the gain potentiometer 188 is connected to the movable element 176 of the reset potentiometer 175. The reset potentiometer 175 can be operable by a signal from a control voltage source 190 designated by the broken line box in FIGURE 6.

Operation of the control circuit

In order to describe the operation of the control circuit, it must be recognized that the control voltage source 190 is representative of the function which is being measured. It should, therefore, be understood that the control voltage source 190 can be conveniently replaced by a suitable sensory mechanism for measuring the changes of a physical variable which is capable of being converted into voltage changes. Consequently, it can be seen that the basic firing angle of the output voltage to the solenoid 8 is controlled by the changes in the sensed physical variable. Inasmuch as the sensed change of the physical variable is capable of being translated to an electrical change, such as a voltage or current change, this change can be physically represented by the control voltage source 190. However, it should be understood that no particular type of control voltage source is herein illustrated or described, inasmuch as the valve positioner of the present invention can be used with any type of electrical controller capable of generating current or voltage changes. The electropneumatic valve positioner herein is illustrated as being operatively connected to a conventional air motor type of controlled valve in order to correct signals to the air motor.

As the position of the valve stem s in the controlled valve V changes, the movable core 183 will also shift between the primary coil 180 and the secondary coil 181. The amount of shift and location of the movable core 183 will generate a secondary voltage in the secondary coil 181. Obviously, the position of the core 183 will determine the size of the voltage induction in the secondary coil 181. The voltage induced in the coil 181 would normally be an alternating current voltage which is rectified by the half-wave rectifier 184. The rate action generator 185 consisting of the fixed resistor 186 and the capacitor 187 will provide a lead action and, in effect, anticipates the fixed position of the main valve stem at its equilibrium position. This anticipation of fixed position and equilibrium tends to reduce the error signal created by the induction of voltage in the coil 181 and prevents an overshoot. By adjusting the gain potentiometer 188, it is possible to reduce the effective voltage of the variable transformer 179. If the gain potentiometer voltage approached zero, there would be no feedback voltage and if the resistance of the gain potentiometer 188 was infinite, the voltage from the secondary coil 181 would be at a maximum value. The position signal will lag which could create oscillation of the control valve B. The gain potentiometer 188 tends to eliminate this instability by reducing the gain to a point below where oscillation of the control valve will no longer exist.

The signal which is generated by the movement of the core 183 within the variable transformer 179 is then transmitted to the degenerated common emitter transistor 170 which is designed to convert the voltage to a current signal with a very high impedance so that the current through the degenerated common emitter transistor 170 passes through the collector 169 thereof. In normal operation, the emitter 172 would be controlled by the voltage within the voltage source 190. However due to the fact that the collector 169 has a high impedance, the current passes through the collector 169 to the capacitor 168. In essence, therefore, the voltage across the transistor 170 merely controls the collector current inasmuch as the current will pass through the collector 169. Moreover, the size of the resistor 173 will determine the current across the transistor 170. The current passing through the collector 169 will charge the capacitor 168 until the capacitor 168 reaches its saturation point.

The unijunction transistor 158 which serves as the relaxation oscillator delivers a current pulse into the base 157 of the silicon controlled rectifier 155 at a controllable time within the positive cycle of the supply voltage from the source of electrical current. This current pulse is delivered to the base 157 of the silicon controlled rectifier 155 from the base-1 159 of the unijunction transistor 158. When the rectifier 155 receives this signal, it will begin to conduct and will continue to conduct until the current attempts to reverse, at which time conventional diode action stops the current flow. However, current flow to the unijunction transistor 158 will continue from the capacitor 168. The operation of the relaxation oscillator uses the principle of the unijunction transistor 158 that conduction between the emitter 161 and base-1 159 is prevented unless the emitter to base-1 voltage is greater than a critical value, that critical value being determined by the base-2 voltage to the base-1 voltage. When this peak voltage is exceeded, the effective resistance between the emitter 161 and the base-1 159 drops and approaches a zero level. Conduction would normally continue until the emitter to base-1 voltage drops below the valley point voltage.

The diode 167 serves as a half-wave rectifier and provides control voltage for the unijunction transistor 158. The control voltage from the half-wave rectifier 167 is reduced and clipped by the limiting resistor 166 and the Zener diode 165 to produce a square wave voltage form. This square wave control voltage produced by this half-wave rectifying circuit consisting of the diode 167, the resistor 166 and the Zener diode 165 is transmitted both to the emitter 161 and to the base-2 160 through the resistor 163. The signal received from the variable transformer 179 (or control voltage source 190) determines the firing time of the unijunction transistor 158 and synchronization with the supply of alternating current is obtained by feeding the base-2 160 with the same square wave signal. The transistor 170, in combination with the capacitor 168, provides a constant current source. The size of the current is determined by the control voltage applied to the transistor 170.

The degenerated common emitter transistor 170 is designed to apply a constant current to the unijunction transistor 158. The voltage differential across the base electrode 171 and the line connecting the resistor 173 and the reset potentiometer 175 determines the current in the emitter circuit of the transistor 170. The charging rate of the current is determined by the value of the resistor 173. The degenerated common emitter transistor 170 is designed to convert the voltage signal received from the variable transformer 179 to a linearly related current signal. The transistor 170 is designed to provide a constant current source regardless of the load maintained thereon, or of the voltage level because of the high source impedance. Similarly, low source impedance devices will deliver constant voltage flows.

If the unijunction transistor 158 is in a conductive state, current flow will be maintained from the base 171 to the emitter 161 of the unijunction transistor 158. If the unijunction transistor 158 is in a non-conductive state, that is, it is not firing, the constant current flow from the degenerated common emitter transistor 170 will charge the capacitor 168. When the unijunction transistor 158 is rendered conductive, the capacitor 168 will discharge to the emitter 161 of the unijunction transistor 158. The maximum steady state current in the unijunction transistor must be less than the valley point current. In essence, the unijunction transistor will remain on or in a conductive state all during the negative half cycle. However, at the end of the half cycle, the unijunction transistor 158 will be rendered conductive. At the start of the positive cycle, there is not sufficient emitter voltage in the unijunction transistor 158 so conduction is stopped and the transistor 158 is rendered non-conductive. At the start of the next half-cycle, the interbase current is now flowing so there is a build up of voltage across the emitter. In fact, the emitter is back biased until there is a sufficient voltage build up across the emitter 161.

When the voltage at the emitter 172 reaches its critical value, the unijunction transistor 170 will fire, thereby discharging the capacitor 168 through the resistor 162 permitting current flow into the base 157 of the silicon controlled rectifier 155. This pulse of current into the base 157 will cause the silicon controlled rectifier 155 to fire and to begin supply of curent to the "load," which consists of the solenoid coil 8. When the control current is larger than the critical value, the capacitor 168 will not have charged to the firing voltage by the end of a positive cycle.

After the unijunction transistor 158 has fired, the capacitor 168 will immediately begin to recharge and, if the current is high enough, may fire again before the end of the half cycle. However, since the silicon controlled rectifier 155 will already be in the conducting state, and the unijunction transistor 158 is rendered non-conductive, this additional pulse caused by the firing of the capacitor 168 will have no effect.

Figure 8:
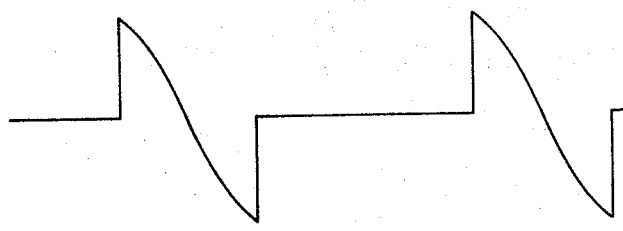
FIGURE 8 is a diagrammatic view of a wave form across the solenoid coil of the valve of FIGURE 2 and which is produced by the control circuit of FIGURE 6.

FIGURE 8 illustrates the conversion of the sine wave provided by the source of alternating electrical current into the wave form transmitted from the silicon controlled rectifier to the solenoid coil 8. It can be seen that the basic voltage output of the controller is a modified sine wave with a rather long quiescent period between each of the pulses. Due to the inductance of the coil 8, a minimum firing angle exists below which the silicon controlled recifier 155 will not conduct even though it obtains firing pulses from the unijunction transistor 158. This condition is caused by the slow build-up of current due to the inductance of the coil 8. If, by the end of the firing pulse, the current has not built up to a point where it is greater than the holding current of the silicon controlled rectifier 155, then conduction will cease. This phenomenon, however, presents no problem with the circuit of the present invention, inasmuch as the minimum firing angle is below the value at which vibration of the valve plunger 23 begins.

After the silicon controlled rectifier 155 has fired, current will begin to flow in the solenoid coil 8, thereby generating magnetic flux which produces a force on the valve plunger 23. This increasing flux around the coil 8 also produces a back electromotive force which opposes the current flow into the coil 8. As the flux increases, the force on the plunger 23 increases until it balances the spring force holding the plunger 23 to the seated position, substantially as shown in FIGURE 2. At this instant, the plunger begins to move decreasing the air gap, that is the space between the plunger stop 22 and the plunger head 25 and further increases the flux around the coil 8. If a constant voltage were applied to the coil 8, this process would ultimately result in the plunger contacting the plunger stop 22. However, the voltage is reduced continually from the instant conduction has started where the firing angles are less than ninety degrees (90°). Thus, before the plunger 23 has reached the stop 22, the pull exerted by the solenoid coil 8 has been substantially reduced and eventually reaches a zero level, when the silicon controlled rectifier 155 stops conducting. By varying the firing angle of the silicon controlled rectifier 155, both the maximum force and the effective pulse width can be varied for causing changes of the effective valve openings.

Theory of operation

A detailed discussion of the pulsed-solenoid control action is provided in copending application Ser. No. 412,921, filed Nov. 23, 1964. However, the following explanation will provide the basic theory of application of the pulsed soleniod action in the electropneumatic valve positioner of the present invention.

Pulsed solenoid control action can be explained by the theory that the plunger is made to vibrate on an orifice by magnetic force and flow control results from controlling the amplitude of the vibrations. This concept, therefore, permits a quantitative description of the operable range of control. There are two major conditions which must exist under the theory that flow control results from controlled vibration of a plunger. The first condition is that the maximum magnetic force generated by the solenoid coil must be greater than the combined spring and gravity forces which holds the plunger against the valve seat. If this condition did not exist, then vibration of the plunger would be impossible. The second condition is that the magnetic force averaged over the power cycle must be less than the force exerted by the spring. If this did not exist, the plunger would be held against the upper stop for at least a portion of the cycle and the normal hysteresis and instability of conventional solenoid valves would then result. In actuality, the average force must be even less than the theoretical average force due to dynamic instability effects. This vibration concept also suggests that the effective valve area and hence the flow rate is proportional to the time integral of the valve lift over the power cycle.

The explanation of the wide dynamic range of the valve herein described lies in almost complete absence of friction, thereby permitting very low amplitude vibrations. Even though the plunger vibrates at least sixty times a second, long seat life has been experienced as a result of low unbalanced forces on the plunger, so that the maximum seating pressure is well within the elastic range of the Teflon seat.

The existence of the stability criterion, that is to say, no motion at the start of a force cycle, explains the reason for success in the use of a half-wave silicon controlled rectifier power source for obtaining effective control, while amplitude control of a sine wave power source is not effective. By the employment of a silicon controlled rectifier power source, the force pulse is followed by a long period, the quiescent period or negative cycle, in which no force pulse is produced by the solenoid. This allows vibrations to be extinguished prior to the next pulse. When compared to the use of sine wave power, an identical force pulse is produced during the negative cycle, and it is necessary to have the vibrations extinguished before this cycle begins. Reduction of the vibration with a sine wave power source materially restricts the operable range of control. Hence, it can be seen that a far greater dynamic range of control is obtainable with the use of a silicon controlled rectifier power source.

From the circuit described in FIGURE 6, it can be seen that an increase of the firing angle of the silicon controlled rectifier 155 increases the effective opening of the pulsed solenoid control valve B and thereby increases the output pressure of the relay E to the air motor. This increase in pressure causes the air motor or so-called main valve V to open. As the main valve V opens, the feedback voltage is thereby reduced and this results in a decrease in the firing angle of the silicon controlled rectifier 155. Thus, it can be seen that a stable situation exists in which the feedback voltage provides just a sufficient amount of pilot flow to hold the main valve V in the preset position. It can also be seen that as the resistance in the gain potentiometer 188 is increased, the system becomes more independent of air flow conditions and, therefore, more independent of the loading of the valve V. Thus at a sufficiently high gain, a fixed position of the reset potentiometer 175 corresponds to a fixed position of the valve stem $s$ of the main valve V. Thus, it can be seen that an electrical signal to the control circuit C will position the stem $s$ of the valve V by means of a fluid power source.

By reference to FIGURE 1, it can be seen that if the air line to the diaphragm of the main valve was opened or if the valve positioner was maintained in an open loop condition, the steady state position of the valve stem $s$ of the main valve V would not change position. In the closed loop circuit of FIGURE 1, air pressure will be fed to the underside of the diaphragm in the main valve V when the control valve B is closed. The initial position of the valve stem $s$ is determined by the instrument signal which is the voltage signal. For purposes of illustration of the present invention, a changing of the reset potentiometer 175 would be a simulation of a change in instrument signal. If the position of the valve stem $s$ is too low for the reset potentiometer setting, the pulsed solenoid control valve B will have a tendency to close. This will, in turn, create pressure on the diaphragm of the relay E, thereby opening the air supply valve in the relay E. Consequently, air will be supplied to the under side of the diaphragm in the main valve V. Application of air to the diaphragm will cause the main valve stem $s$ to lift.

The shifting of the main valve stem $s$ moves the core 183 between the primary and secondary coils 180, 181 of the transformer 179 which serves as a sensor. In essence, the transformer 179 is designed to sense the change of position of the valve stem $s$. If the valve stem $s$ lifts its relative position with regard to the secondary coil 181, a reduced signal is supplied to the control circuit C. This reduced signal tends to open the pulsed solenoid control valve B in a manner hereinafter described. In essence, the control circuit compares the fixed voltage maintained by the reset potentiometer 175 with the comparative voltage of the transducer or variable transformer 179.

If the position of the main valve stem $s$ is too high with respect to the position of the reset potentiometer 175, which is a simulation of an instrument signal, the pulsed solenoid control valve B tends to open. When the pulsed solenoid valve B is open, it will vent the fluid from the air source thereby reducing the pressure on the diaphragm of the relay E. As this occurs, the pressure to the main valve V will be reduced and vented to the atmosphere. As a result thereof, pressure bleeds from the underside of the diaphragm in the main control valve V thereby permitting the valve stem $s$ to move to a lower position. As the valve stem $s$ moves to a lower position, the signal to the control circuit C increases as a result of the displacement of the movable core 183 and the variable transformer 179. This signal has the counterbalancing effect which tends to close the pulsed solenoid control valve B. Thus, through the balancing effect of the reduced pressure on the main valve diaphragm and the changing of the orifice in the control valve B pursuant to the changed control signal, the valve stem $s$ achieves a new equilibrium position which is proportional to the change on the reset potentiometer 175. It can thus be seen that the operation of the valve positioner is based upon a balancing of a feedback voltage against a set-point voltage.

When the gain is too high to accomplish the above objective, the system will oscillate due to lags associated with the volumes of the main valve V and the volume of the control pressure system. This is corrected by the introduction of the leading signal accomplished by the control rate generator 185. The purpose of the lead action is to anticipate the eventual steady-state requirements before the valve V achieves the set position.

From the above, it can be seen that the electro-pneumatic valve positioner of the present invention eliminates the mechanical linkages which were necessary in the valve positioners of the prior art. Accordingly, it is no longer necessary to use the so-called "flapper" valve to provide a variable orifice. The pulsed solenoid flow control action of the electropneumatic valve positioner A now makes it possible to perform this function with an electric signal. As a result thereof, the inevitable backlash, dead zone and hysteresis normally found in the valve positioners of the prior art has been completely eliminated. The fast response of pulsed solenoid control action also provides high speed operation. The electrical feedback circuit used in the present valve positioner makes it easy to generate rate action needed to stabilize the system. This is accomplished by adjustment of the resistor 186 and capacitor 187. Adjustment of the gain potentiometer 188 makes it possible to critically damp the system thereby obtaining high gain and excellent dynamic response.

The present valve positioner can be sized for use with any size control valve. The circuit is adapted to accept voltage, current or digital input signals. Moreover, the unequaled accuracy of this particular system makes the electropneumatic valve positioner attractive for direct digital control applications where superior valve performance is required.

Example

The invention is further illustrated by, but not limited to, the following example:

An electropneumatic valve positioner was constructed in accordance with the present invention by employing a conventional air supply source with a conventional pressure regulator designed to provide a constant downstream air pressure of 20 lbs. p.s.i.g. The downstream constant pressure line was thereafter connected to a Foxboro 40D relay which was, in turn, pneumatically connected to a conventional air motor. Also connected to the constant air pressure line was a pulsed solenoid control valve. The control valve B which was employed in the valve positioner was a Hoke S90A320CT solenoid valve which had the following valve dimensions:

| | |
|---|---|
| Plunger weight _____ gm__ | 16 |
| Plunger outer diameter _____ cm__ | 0.92 |
| Plunger stop outer diameter _____ cm__ | 0.84 |
| Plunger cross sectional area _____ cm.$^2$__ | 0.67 |
| Effective axial plunger length _____ cm__ | 4.4 |
| Outer shell, outer diameter of plunger ___ cm__ | 4.1 |
| Outer shell thickness _____ cm__ | 0.119 |
| Orifice diameter _____ inch__ | 1/8 |
| Air gap when plunger seated _____ cm__ | 0.125 |

The solenoid coil of the control valve is characterized by the following data:

| | |
|---|---|
| Total coil turns _____ | 4000 |
| DC resistance (including compensator resistors) _____ ohms__ | 265 |
| Wire size _____ ga__ | 33 |
| Coil inner diameter _____ cm__ | 1.35 |
| Coil outer diameter _____ cm__ | 2.98 |
| Coil height _____ cm__ | 3.15 |

This valve was fitted with a Teflon seat and had an all stainless steel construction. The valve which was constructed of type 430F stainless steel had an initial permeability of 200, a maximum permeability of 1400 and a saturation flux density of 14,000 grams. The bottom of the plunger was milled to a relatively flat surface.

Thereafter, a valve seat die constructed of 1/8 inch inner diameter copper-brass tubing with the upper end flared to a 60° conical section was employed to make a die for Teflon tubing. The Teflon tubing was thereafter used to make a valve seat with a conical section having a 40° angle with respect to the axial centerline of the tube. The Teflon tube had a length of 5/8 inch and was inserted within a stainless steel retainer sleeve. The retainer sleeve was formed of a 5/16 inch outer diameter washer having a 1/8 inch inner diameter bore. Moreover, it was provided with an 82° countersink at its upper end for accommodating the flared out end of the Teflon tube. The washer thus provided a back-up for the Teflon cone. The lower end of the Teflon tube was then inserted into the intake orifice of the valve and tightly pressed therein in fluid-tight engagement with the walls of the inlet port. For a seating ball, a 7/32 inch ball bearing was inserted between the lower end of the valve plunger and the conically shaped seat in a free floating state. A 5/16 inch Teflon ring having a 1/8 inch central bore with a diameter of approximately 0.005 inch greater than the steel part of the plunger was disposed between the valve body and the steel retainer ring. The Teflon ring served as a back-up washer and prevented the steel retainer ring from vibrating against the body of the valve and also aided in the reduction of uncontrolled radial vibrations.

Thereafter, an all-Teflon sheath was disposed tightly around the valve plunger and inserted into the tube of the upper portion of the valve. The plunger was formed of a 430F stainless steel material with a 0.250 inch outer diameter. The Teflon sheath had an outer diameter dimension of 0.376 inch and was drilled to form a 0.246 inch bore for accommodating the valve plunger. The upper end thereof was fit flush with the upper end of the valve plunger.

The valve was next connected to a control circuit which was constructed in conformance with FIGURE 6 with the following parts.

| Part | Reference numeral | Specifications |
|---|---|---|
| Resistor_____ | 178 | 10K ohm. |
| Do_____ | 177 | 50K ohm. |
| Do_____ | 173 | 10K ohm. |
| Do_____ | 163 | 2.2K ohm. |
| Do_____ | 162 | 47 ohm. |
| Do_____ | 166 | 3.5K ohm, 10 watts. |
| Do_____ | 186 | 10K ohm. |
| Do_____ | 182 | 2K ohm, 25 watts. |
| Potentiometer_____ | 175 | 100K ohm, 10 turn 2 watts. |
| Do_____ | 188 | 5K ohm, 2 watts. |
| Capacitor_____ | 168 | 0.1 mfd., 200 volts. |
| Do_____ | 174 | 100 mfd., 25 volts. |
| Do_____ | 187 | 5 mfd., 25 volts. |
| Do_____ | 189 | 5 mfd., 25 volts. |
| Diode_____ | 167 | 1N 1695. |
| Do_____ | 165 | 1N 1779, 22 v. Zener. |
| Do_____ | 164 | 1N 1695. |
| Do_____ | 184 | TI60. |
| PNP transistor_____ | 170 | 2N3250. |
| Unijunction transistor_____ | 158 | 2N1671A. |
| Silicon controlled rectifier_____ | 155 | 2N1597. |
| Variable transformer_____ | 179 | Schaevitz 300 SS-LT. |
| Constant voltage transformer__ | 152 | Sola Cat. No. 23-13-060 60 V.A. at 115 v. |

Resistors: in ohms, 1/2 w. unless specified.
Capacitors in mfd.

The Hoke valve was provided with a discharge pipe having a 0.05 inch inner diameter connected to the discharge port of the valve. A restriction of 0.010 inch diameter was formed in the discharge pipe downstream of the connection to the relay creating a negative feedback condition.

To be of use in a practical control operation, the combination of the controller and valve must be insensitive to ambient temperature changes and line voltage changes. As might be expected from the principle of operation, sensitivity to line voltage variation was found to be considerable. The sources of ambient temperature arise from the effect of temperature on the solenoid coil resistance and the effect of temperature on the unijunction transistor relaxation oscillator. Both of these effects were eliminated by adjusting the resistors experimentally to produce no flow change on heating the components in question from 25 to 40° C. with a hot air gun.

In this particular experiment, air was the fluid employed and adjusted to flow at 20 p.s.i.g. pressure entering under the valve plunger. For the purposes of this experiment, the control voltage was maintained at zero and the voltage variation was obtained by varying the reset potentiometer 175. At a 1000 potentiometer reading, the voltage between the positive conductor 50 and the base of the degenerative common emitter 172 was 3.12 volts. This voltage was linear with the potentiometer resettings. The voltage between the positive conductor 50 and the emitter 172 of the transistor 170 was less than the 3.12 voltage reading by 0.6 volt. The silicon controlled rectifier firing angle was determined by measuring the sine of the angle on an oscilloscope.

Designating $y$ as the fraction of the reset potentiometer 175 between the positive conductor 50 and the movable element 176, simple transistor theory can be employed in conjunction with electrical measurement to yield the following correlation:

$$3.12y - 0.6 - V_x = \frac{0.557}{.5 - a_6}$$

where the constant 0.557 is related to the unijunction transistor peak point voltage, the emitter degenerating resistance and the unijunction transistor capacitor 168.

For electrical "damping," optimum response is obtained when the resistor 186 is maintained at 10K ohms and the gain potentiometer 182 is maintained at 3K ohms. The open loop gain was approximately 31. Consequently, noise is materially reduced to value of plus or minus 0.0005 inch over a thirty-second period. With the gain potentiometer set at 3K ohms and the fluid pressure was maintained at 30 p.s.i.g. on the inlet line, the reset potentiometer was used to vary the set point corresponding to a voltage signal as an input and the following data, set forth in Table II were obtained.

TABLE II

| Potentiometer setting | Lift (inches) | Average air pressure (p.s.i.g.) |
|---|---|---|
| .506 | 0 | 0-2 |
| .535 | .100 | 6.7 |
| .565 | .200 | 8.5 |
| .595 | .300 | 10.5 |
| .623 | .400 | 13.2 |
| .650 | .500 | 15.6 |

A plot of the lift versus potentiometer setting formed a linear relationship. The hysteresis was determined by measuring the lift on the voltage signal and was determined to be less than 0.0005 inch. Repeatability of results was within the area of plus or minus 0.0003 inch. Changing the inlet pressure from 30 to 29 p.s.i.g., pressure results in a lift dropping of 0.008 inch and changing the line voltage from 120 to 130 volts results in a lift increase of 0.050 inch. The estimated undershoot and overshoot was determined to be no greater than 3 percent.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, and means in said control means for regulating said pulse signals to control the lift-time history of said valve plunger by causing repetitive cycles of an opening period, a closing period and a quiescent period thereby preventing said plunger from contacting its upper limit of travel and enabling said plunger to engage said valve seat in a condition of dynamic rest between each said pulse during the vibrating action for regulating the fluid supplied to said device, whereby fluid is admitted to said device to bias said movable element in such direction so that a change in signal of the sensing means would tend to initiate opposite action.

2. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, means in said control means for regulating said pulse signals to control the lift-time history of said valve plunger by causing repetitive cycles of an opening period, a closing period and a quiescent period thereby preventing said plunger from contacting its upper limit of travel and enabling said plunger to engage said valve seat in a condition of dynamic rest between each said pulse during the vibrating action for regulating the fluid supplied to said device, whereby fluid is admitted to said device to bias said movable element in such direction so that a change in signal of the sensing means would tend to initiate opposite action, and relay means pneumatically interposed between said dynamically operable device and said control valve and being actuable responsive to the quantity of fluid flowing through said control valve.

3. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being 7. The electropneumatic positioner according to claim 3, characterized by the fact that the solenoid operated pilot valve is opened in powered on condition.

8. The electropneumatic positioner according to claim 3, characterized by the fact that the solenoid operated pilot valve uses a pressure signal generated between the pilot valve and a fixed restriction to actuate the movable element of the dynamically operable device.

9. The electropneumatic positioner according to claim 3, characterized by the fact that the control means comprises a control circuit including a rate action generator which anticipates the desired position of the movable element for providing a lead action for the positioning signal produced by the sensing means.

10. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, sensing means including a variable transformer operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, means in said control means for regulating said pulse signals to control the lift-time history of said valve plunger by causing repetitive cycles of an opening period, a closing period and a quiescent period thereby preventing said plunger from contacting its upper limit of travel and enabling said plunger to engage said valve seat in a condition of dynamic rest between each said pulse during the vibrating action for regulating the fluid supplied to said device, whereby fluid is admitted to said device to bias said movable element in such direction so that a change in signal of the sensing means would tend to initiate opposite action, fixed orifice means located on the outlet side of said control valve for creating a negative feedback condition across said control valve and stabilizing the operation of said control valve, relay means pneumatically interposed between said dynamically operable device and said control valve and being actuable responsive to the quantity of fluid flowing through said valve, rate generating means operatively connected to said control means for creating an electrical lead action to anticipate a steady state equilibrium position thereby stabilizing the control means, and means for adjusting the loop gain of said control means to prevent oscillation in the positioning system.

11. An electropneumatic positioning system for positioning the movable element of a device which is dynamically operable in response to a control signal; said positioning system comprising in combination a fluid supply source, a pulsed-solenoid operated control valve having a solenoid, a valve seat and a dithering valve plunger which vibrates with respect to said valve seat to control flow, said valve being operatively connected to said fluid supply source, control means operatively connected to said control valve for transmitting a current signal to the solenoid of said valve and initiating a magnetically generated force to cause a dithering action of said plunger and to regulate the quantity of fluid passing through said valve in relation to the current signal from said control means, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said current signal and balancing said signals to establish equilibrium conditions, and means in said control means for controlling the lift-time history of said plunger to cause a repetitive cycle of said plunger including an opening period, a closing period and a quiescent period such that during the opening period the plunger never contacts its uppermost limit of travel and during the quiescent period the plunger contacts the valve seat in a condition of dynamic rest with simultaneous zero velocity and zero acceleration for regulating the fluid supplied to said device, whereby fluid is admitted to said device to bias said movable element in such direction so that a change in signal of the sensing means would tend to initiate opposite action.

12. An electropneumatic positioning system for positioning the movable element of a device which is dynamically operable in response to a control signal; said positioning system comprising in combination a fluid supply source, a pulsed-solenoid operated control valve having a solenoid, a valve seat and a dithering valve plunger which vibrates with respect to said valve seat to control flow, said valve being operatively connected to said fluid supply source, control means operatively connected to said control valve for transmitting a current signal to the coil of said valve and initiating a magnetically generated force to cause a dithering action of said plunger and to regulate the quantity of fluid passing through said valve in relation to the current signal from said control means, sensing means operatively associated with the movable element of said dynamically operable device for sensing a change of position said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said current signal and balancing said signals to establish equilibrium conditions, and means in said control means for controlling the current-time history of said plunger to cause a repetitive cycle of said plunger including an opening period, a closing period and a quiescent period such that during the opening period the plunger never contacts its uppermost limit of travel and during the quiescent period the plunger contacts the valve seat in a condition of dynamic rest with simultaneous zero velocity and zero acceleration for regulating the fluid supplied to said device, whereby fluid is admitted to said device to bias said movable element in such direction so that a change in signal of the sensing means would tend to initiate opposite action.

13. An electropneumatic positioning system for positioning the movable element of a device which is dynamically operable in response to a control signal; said positioning system comprising in combination a fluid supply source, a pulsed-solenoid operated control valve having a solenoid, valve seat and a dithering valve plunger which vibrates with respect to said valve seat to control flow, said valve being operatively connected to said fluid supply source, control means operatively connected to said control valve for transmitting a current signal to the solenoid of said valve and initiating a magnetically generated force to cause a dithering action of said plunger and to regulate operatively connected to said fluid supply source, control means operatively connected to said control valve for initiating electrical pulse signals to cause a dithering action of said plunger and to regulate the quantity of fluid passing through said valve in relation to the electrical pulse signals from said control means, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, means in said control means for regulating said pulse signals to control the lift-time history of said valve plunger by causing repetitive cycles of an opening period, a closing period and a quiescent period thereby preventing said plunger from contacting its upper limit of travel and enabling said plunger to engage said valve seat in a condition of dynamic rest between each said pulse during the vibrating action for regulating the fluid supplied to said device, whereby fluid is admitted to said device to bias said movable element in such direction so that a change in signal of the sensing means would tend to initiate opposite action, fixed orifice means located on the outlet side of said control valve for creating a negative feedback condition across said control valve and stabilizing the operation of said control valve, and relay means pneumatically interposed between said dynamically operable device and said control valve and being actuable responsive to the quantity of fluid flowing through said valve.

4. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, sensing means including a variable transformer operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, and means in said control means for regulating said pulse signals to control the lift-time history of said valve plunger by causing repetitive cycles of an opening period, a closing period and a quiescent period thereby preventing said plunger from contacting its upper limit of travel and enabling said plunger to engage said valve seat in a condition of dynamic rest between each said pulse during the vibrating action for regulating the fluid supplied to said device, whereby fluid is admitted to said device to bias said movable element in such direction so that a change in signal of the sensing means would tend to initiate opposite action.

5. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, means in said control means for regulating said pulse signals to control the lift-time history of said valve plunger by causing repetitive cycles of an opening period, a closing period and a quiescent period thereby preventing said plunger from contacting its upper limit of travel and enabling said plunger to engage said valve seat in a condition of dynamic rest between each said pulse during the vibrating action for regulating the fluid supplied to said device, whereby fluid is admitted to said device to bias said movable element in such direction so that a change in signal of the sensing means would tend to initiate opposite action, and rate generating means operatively connected to said control means for creating an electrical lead action to anticipate a steady state equilibrium position thereby stabilizing the control means.

6. An electropneumatic positioning system for positioning the movable element of a device which is dynamically operable in response to a control signal; said positioning system comprising in combination a fluid supply source, a pulsed-solenoid operated control valve having a valve seat and a dithering valve plunger which vibrates with respect to said valve seat to control flow, said valve being operatively connected to said fluid supply source, control means operatively connected to said control valve for initiating electrical pulse signals to cause a dithering action of said plunger and to regulate the quantity of fluid passing through said valve in relation to the electrical pulse signals from said control means, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said pulse signal and balancing said signals to establish equilibrium conditions, means in said control means for regulating said pulse signals to control the lift-time history of said valve plunger by causing repetitive cycles of an opening period, a closing period and a quiescent period thereby preventing said plunger from contacting its upper limit of travel and enabling said plunger to engage said valve seat in a condition of dynamic rest between each said pulse during the vibrating action for regulating the fluid supplied to said device, whereby fluid is admitted to said device to bias said movable element in such direction so that a change in signal of the sensing means would tend to initiate opposite action, and means for adjusting the loop gain of said control means to prevent oscillation in the positioning system.

the quantity of fluid passing through said valve in relation to the current signal from said control means, sensing means operatively associated with the movable element of said dynamically operable device for sensing a change of position in said movable element, said sensing means creating a position signal in proportion to the change of position of said movable element, electrical feedback means operatively connecting said sensing means and said control means for electrically transmitting said position signal to said control means, summing means operatively associated with said control means for comparing the position signal with said current signal and balancing said signal to establish equilibrium conditions, and means in said control means for controlling the duration of the current signals to said solenoid to regulate the size of the magnetically generated force to cause a net unbalance of forces on said plunger thereby causing said plunger to move in a repetitive cycle including an opening period, a closing period, and a quiescent period, such that during the opening period the plunger never contacts its uppermost limit of travel and during the quiescent period the plunger contacts the valve seat in a condition of dynamic rest with simultaneous zero velocity and zero acceleration for regulating the fluid supplied to said device, whereby fluid is admitted to said device to bias said movable element in such direction so that a change in signal of the sensing means would tend to initiate opposite action.

14. The method of positioning the stem of a main valve in response to a change in instrument signal operating said valve, said method comprising sensing the change of the position of the main valve stem, creating an electrical signal in proportion to the change of the position of the main valve stem, transmitting said electrical signal to a control circuit operating a dithering solenoid operated pilot valve having a solenoid, a valve seat and a plunger movable with respect to said valve seat, comparing the instrument signal to the signal produced by the change of position of the main valve stem, and producing a corrective signal, generating an electrical current in said control circuit and transmitting said current to said solenoid to produce a magnetically generated force, applying said magnetically generated force to said plunger to create a dithering action of said plunger in said pilot valve controlling the lift-time history to cause repetitive cycles of vibratory movement of the plunger in said pilot valve thereby effectively regulating the size of an orifice in said pilot valve and thereby controlling the flow through said pilot valve in response to the size of the corrective signal wherein each of said cycles includes an opening period, a closing period and a quiescent period such that during the opening period the plunger never contacts its upper limit of travel and during the quiescent period said plunger in said pilot valve engages the valve seat in a condition of dynamic rest creating a pressure between said main valve and said pilot valve in direct proportion to the size of the corrective signal, and regulating the fluid flow to said main valve in response to the change of downstream pressure on said pilot valve until the changing position of the main valve stem produces a signal which eliminates the corrective signal thus produced and achieves a steady state equilibrium position.

15. The method of positioning the stem of a main valve in response to a change in instrument signal operating said valve, said method comprising sensing the change of the position of the main valve stem, creating an electrical signal in proportion to the change of the position of the main valve stem, transmitting said electrical signal to a control circuit operating a dithering solenoid operated pilot valve having a solenoid, a valve seat and a plunger movable with respect to said valve seat, comparing the instrument signal to the signal produced by the change of position of the main valve stem, and producing a corrective signal, generating an electrical current in said control circuit and transmitting said current to said solenoid to produce a magnetically generated force, applying said magnetically generated force to said plunger to create a dithering action of said plunger in said pilot valve, controlling the lift-time history to cause repetitive cycles of vibratory movement of the plunger in said pilot valve thereby effectively regulating the size of an orifice in said pilot valve and thereby controlling the flow through said pilot valve in response to the size of the corrective signal, wherein each of said cycles includes an opening period, a closing period and a quiescent period such that during the opening period the plunger never contacts its upper limit of travel and during the quiescent period said plunger in said pilot valve engages the valve seat in a condition of dynamic rest, maintaining a large force differential across the orifice of said pilot valve in comparison to the other forces acting on the valve plunger of said pilot valve, creating a pressure between said main valve and said pilot valve in direct proportion to the size of the corrective signal, and regulating the fluid flow to said main valve in response to the change of downstream pressure on said pilot valve until the changing position of the main valve stem produces a signal which eliminates the corrective signal thus produced and achieves a steady state equilibrium position.

References Cited
UNITED STATES PATENTS

| | | | |
|---|---|---|---|
| 2,588,522 | 3/1952 | Harris | 251—30 X |
| 2,789,543 | 4/1957 | Popowsky | 91—459 X |
| 3,015,768 | 1/1962 | Hornfeck et al. | 137—487.5 X |
| 3,020,886 | 2/1962 | Jones et al. | 91—459 X |
| 3,036,598 | 5/1962 | Smith et al. | 91—459 X |
| 3,266,379 | 8/1966 | Kreuter | 91—459 X |
| 3,307,824 | 3/1967 | Weisheit | 251—131 |
| 2,843,147 | 7/1958 | Penther | 251—141 X |
| 3,247,912 | 4/1966 | Reynolds | 251—129 X |

ARNOLD ROSENTHAL, Primary Examiner

U.S. Cl. X.R.

91—363, 429, 459; 251—30